United States Patent [19]

Kiehling et al.

[11] 4,448,693
[45] May 15, 1984

[54] METHOD FOR PARTIALLY DESALINATING WATER WITH A WEAKLY ACID AND STRONGLY BASIC ION EXCHANGER MATERIALS AND SUBSEQUENTLY REGENERATING THE ION EXCHANGER MATERIALS

[75] Inventors: Brigitte Kiehling, Karlsruhe; Wolfgang Höll, Ettlingen, both of Fed. Rep. of Germany

[73] Assignee: Kernforschungszentrum Karlsruhe GmbH, Karlsruhe, Fed. Rep. of Germany

[21] Appl. No.: 344,072

[22] Filed: Jan. 28, 1982

[30] Foreign Application Priority Data

Jan. 28, 1981 [DE] Fed. Rep. of Germany ...... 3102693
Nov. 24, 1981 [EP] European Pat. Off ......... 81109498

[51] Int. Cl.³ .............................................. B01J 49/00
[52] U.S. Cl. .................................... 210/673; 210/677; 210/685; 210/686; 210/687
[58] Field of Search ............... 210/673, 677, 685, 686, 210/661, 687; 521/26

[56] References Cited

U.S. PATENT DOCUMENTS

| | | | |
|---|---|---|---|
| 1,671,864 | 5/1928 | Higgins | 210/661 |
| 2,656,245 | 10/1953 | Gray et al. | 23/64 |
| 3,111,485 | 11/1963 | Kunin | 210/686 |
| 3,359,199 | 12/1967 | Schmidt | 210/685 |
| 3,691,109 | 9/1972 | Larsen | 210/677 |
| 4,299,922 | 11/1981 | Holl et al. | 210/673 |

FOREIGN PATENT DOCUMENTS

| | | |
|---|---|---|
| 240291 | 9/1964 | Austria . |
| 1259840 | 2/1968 | Fed. Rep. of Germany . |
| 1901043 | 8/1970 | Fed. Rep. of Germany . |
| 2487435 | 5/1980 | Fed. Rep. of Germany . |

OTHER PUBLICATIONS

Kunin et al., "Regeneration of Carboxylic Cation Exchange Resins with Carbon Dioxide", Ind. and Eng. Chem., vol. 2, No. 1, Mar. 1963, pp. 1–3.
Epstein et al., "Desalination of Brackish Waters by ion Exchange", Ion Exchange and Membranes, vol. 1, 1973, pp. 159–170.

Primary Examiner—Ivars C. Cintins
Attorney, Agent, or Firm—Sughrue, Mion, Zinn, Macpeak & Seas

[57] ABSTRACT

A process for the partial desalination of water with a combination of weakly acid cation exchangers in free acid form and basic anion exchangers in hydrogen carbonate form, both present in aqueous suspensions, and subsequent regeneration of the charged ion exchanger material. The partial desalination is effected with a combination or mixture of a weakly acid cation exchanger material and a basic anion exchanger material. Depending on the combination or mixing ratio of the two exchangers, non-equivalent quantities of neutral salt cations and anions are removed from the water. The regeneration of both exchangers together is effected exclusively with the aid of $CO_2$.

16 Claims, 5 Drawing Figures

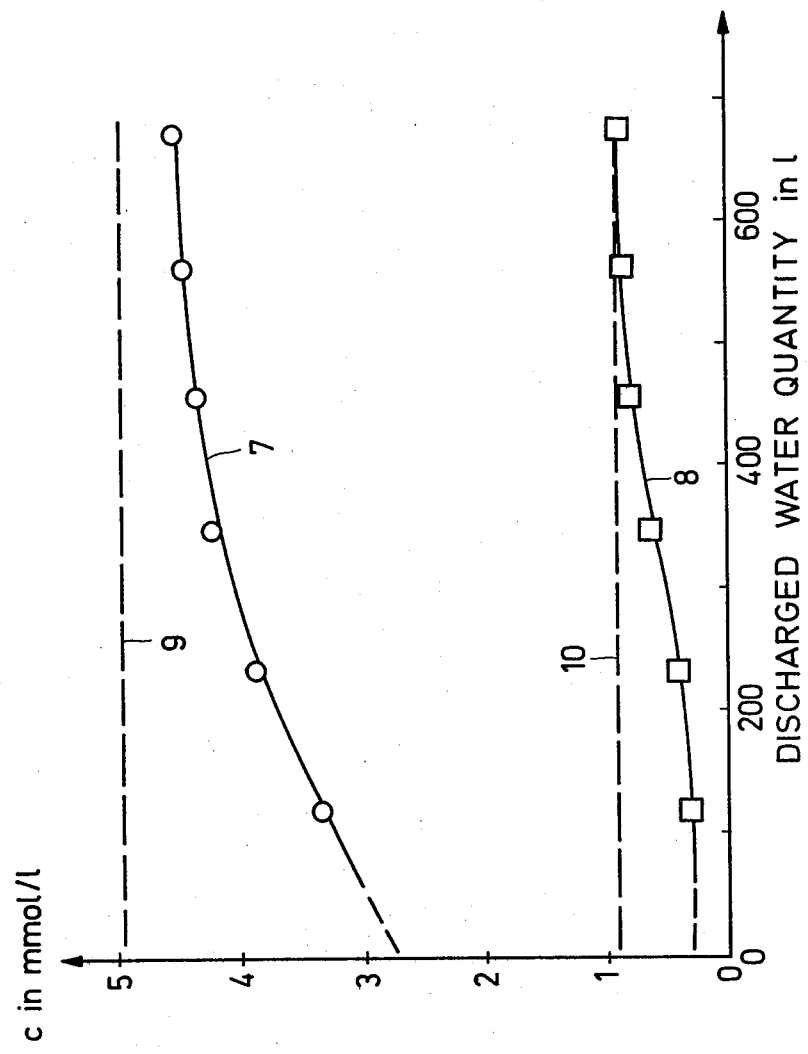

METHOD FOR PARTIALLY DESALINATING WATER WITH A WEAKLY ACID AND STRONGLY BASIC ION EXCHANGER MATERIALS AND SUBSEQUENTLY REGENERATING THE ION EXCHANGER MATERIALS

BACKGROUND OF THE INVENTION

The present invention relates to a method for the partial desalination of water using a combination of a weakly acid cation exchanger in free acid form and a basic anion exchanger in hydrogen carbonate (bicarbonate) form, both exchangers being present in aqueous suspensions, and the subsequent regeneration of the charged ion exchanger materials.

As a result of increasing demands for water, more and more water supply systems are forced to use ground water or surface water which, although hygienically acceptable, has too high a salt content. The dissolved salts in these waters are mainly calcium and magnesium compounds whose concentrations are generally determined by regional geochemical conditions. The "Atlas zur Trinkwasserqualität der Bundesrepublik Deutschland", in translation, "Atlas of Drinking Water Quality of the Federal Republic of Germany" shows that hard groundwaters, that is, those having relatively high concentrations of $Ca^{++}$ and/or $Mg^{++}$, occur more frequently in Southern Germany. Water from lime or dolomite layers have higher carbonate hardnesses, but there also are areas where the groundwater contains much sulfate and the total salt content is at about 1000 mg/l, for example, in Central Franconia. In areas with intensive agricultural usage and correspondingly heavy fertilization, the groundwater often contains nitrate ions in concentrations up to 250 mg/l, which may be damaging to human health.

To avoid health damage, the Drinking Water Regulations of the Federal Republic of Germany prescribe that the sulfate content must be a maximum of 250 mg/l and the nitrate content no more than 90 mg/l. According to an EG (European Community) Guideline, this latter limit value will be lowered in the future to 50 mg/l, which will force numerous waterworks to take suitable processing measures to achieve this lower limit.

It is the general opinion that the total salt content of drinking water should not exceed 500 mg/l. A limitation on water hardness and neutral salt content is therefore desirable in many cases, and is particularly desirable from the point of view of chemical corrosion. When hard water is used, corrosion phenomena can be expected in zinc-coated pipelines and will be enhanced by the presence of neutral salt anions in higher concentrations. Also for reasons of corrosion protection, it is necessary, when mixing waters from different sources, to effect partial softening with matching of the carbonate hardnesses.

Partial desalination is also of significance for industrial use of water. In many cases cooling water must be partially softened. In industrial plants, large quantities of salt often enter the waste water which could be reused if it were possible to inexpensively and effectively reduce the salt content.

Weakly acid cation exchanger resins contain carboxyl groups as functional components. Analogously to the dissociation behavior of weak acids, for example, organic acids, these functional components are only weakly dissociated. Such weakly acid exchangers therefore have only a limited operating range, namely, an operating pH range of >4 to 14, and are capable only of dissociating salts of weak acids, for example, salts of carbonic acid. In water processing, weakly acid cation exchanger resins are used mostly for decarbonization (softening), i.e. to remove a quantity of cations equivalent to the hydrogen carbonate (bicarbonate) concentration of the water. Due to the selectivity of exchanger resins for multivalent cations, such a weakly acid cation exchanger absorbs predominantly calcium and magnesium ions.

During the regeneration, these absorbed cations must be displaced again by hydrogen ions. Customarily this is done with nitric acid or sulfuric acid, in a concentration which avoids precpitation of calcium sulfate dihydrate.

Weakly acid exchangers have a distinctly strong affinity to $H^+$ ions so that the regenerating acid, in contradistinction to the regeneration of strongly acid exchanger resins, needs to be neither particularly pure nor particularly concentrated. Therefore, the weakly acid exchangers can also be regenerated with weak acid. The use of carbonic acid as a regeneration agent for weakly acid cation exchange resins was proposed for the first time in 1953 by Gray and Crosby in U.S. Pat. No. 2,656,245.

Kunin and Vassiliou, in Industrial and Engin. Chem. Product Research and Development, Volume 2 (1963), No. 1, pages 1 to 3, describe the use of $CO_2$ for the regeneration of sodium charged carboxylic cation exchanger resins under pressures up to 300 psi. However, the regeneration effect must be supported by extraction of the (alkali) $NaHCO_3$ solution which is formed during the regeneration. A similar method is disclosed in U.S. Pat. No. 3,691,109 to Larsen where the discharged $NaHCO_3$ solution from the regeneration of a weakly acid cation exchanger is further processed by degassing to form a degassed solution which can then be used to regenerate weakly basic anion exchange resins.

Berger-Wittmar and Sontheimer, in an article entitled "Regeneration schwach saurer Ionenaustauscher mit Kohlendioxid," appearing in Vom Wasser, Vol. 50, 1979, pages 297 to 329, describe the effectiveness of the regeneration of $Ca^{++}$, $Mg^{++}$, $Na^+$ and $K^+$ charged weakly acid cation exchanger resins. It was found there that bivalent calcium and magnesium ions are bound more strongly to the exchanger resins than monovalent cations. In order to realize a somewhat satisfactory efficiency, the article discloses that higher $CO_2$ pressures are required.

German Offenlegungsschrift No. 2,714,297 discloses a process for regenerating weakly acid ion exchanger resins by carbonic acid to precipitate calcium carbonate. In this process, the weakly acid cation exchange resin is regenerated in a fluidized bed under increased pressure. In order to accelerate the calcium carbonate precipitation, crystallization seeds in the form of powdered, finely crystalline $CaCO_3$ are added from the start. This addition of $CaCO_3$, however, reduces the efficiency of the regeneration since it increases the pH to such an extent that only little useful capacity can be generated.

Charged anion exchange resins can be partially converted to the bicarbonate ion charged form with the aid of $CO_2$. However, this conversion is successful only if the regenerating solution has a pH at which the bicarbonate ions produced by the introduction of $CO_2$ have a sufficient concentration. With $CO_2$ alone, the effect is only minimal. In the process according to German Offenlegungsschrift No. 2,851,135, corresponding to U.S. Pat. No. 4,299,922, this difficulty has been overcome by adding a solid calcium compound to provide a favorable pH. The addition of such a compound, e.g. in the form of $CaCO_3$, however, has drawbacks.

The following processes are considered to be state of the art with respect to partial desalination:

(a) Partial desalination with decarbonization with weakly acid ion exchangers. The exchangers are introduced in the free acid form and remove a quantity of bivalent metal cations equivalent to the hydrogen carbonate concentration of the water. The carbonate hardness is converted to degasifiable carbonic acid while sulfates, nitrates and chlorides remain uninfluenced. See Dorfner, *Ionenaustauscher*, in translation, Ion Exchangers, 3rd Edition, published by De Gruyter, Berlin, 1970, pages 170–173.

(b) Full desalination of a partial stream of the untreated water with the aid of strongly acid cation exchangers in $H^+$ form and strongly basic anion exchangers in $OH^-$ form, and subsequent mixing of the resulting fully desalinated stream with the untreated water. The cation exchangers are regenerated with hydrochloric acid or sulfuric acid, and the anion exchangers are regenerated with soda liquor. (Usual technique in partial demineralization). The cation and anion exchangers can also be present together in the form of a mixed bed.

(c) The DESAL process. In the Desal process, a weakly basic anion exchange resin in $HCO_3^-$ form is used in a first column and a weakly acid cation exchange resin is used in a second column which is connected in series with the first column. The water to be treated is passed through the weakly basic anion exchange resin to initially convert neutral salts to bicarbonates. The water then passes through the series connected second column in which the weakly acid cation exchanger then removes all cations and converts the bicarbonates to carbonic acid. In a two-bed Desal process, the resulting carbonic acid is extracted as $CO_2$ by passage through a decarbonator. In a three-bed Desal process, the resulting carbonic acid is passed into a third column containing a weakly basic anion exchange resin in the free-base form to convert the resin in the third column to the bicarbonate form. See Dorfner, supra, pages 186 to 188, and Epstein et al, "Desalination of Brackish Waters By Ion Exchange," *Ion Exchange and Membranes*, 1973 Vol. 1, pp. 159–170.

The Desal process has the following drawbacks:

The weakly basic resin in bicarbonate form in the first column converts the neutral salts, preferably NaCl, to bicarbonates. The series-connected weakly acid exchanger, which is capable of dissociating only the salts of weak acids (e.g. salts of carbonic acid), then removes a quantity of cations equivalent to the bicarbonate concentration. The elimination of neutral salt anions and neutral salt cations is thus coupled stoichiometrically.

For regeneration in the two-bed Desal system, the charged weakly basic resin in the first column is initially converted into the free base form with $NH_3$ and is then brought into the bicarbonate form with $CO_2$. The weakly acid exchanger is regenerated with sulfuric acid. For regeneration in the three-bed Desal process, the weakly basic anion exchanger in the first column is converted into the free base form with $NH_3$ and the weakly basic anion exchanger in the third column is converted by the introduction of carbon dioxide to a major portion in the bicarbonate form and to a minor portion in the hydroxyl form. The weakly acid exchanger is regenerated with sulfuric acid. Thereafter, the three columns are again ready for the next desalination process, which then takes place in the opposite direction, i.e. the water to be treated is now charged into the third column.

(d) The LARSEN process disclosed in U.S. Pat. No. 3,691,109.

In the Larsen process, the neutral salts are converted to bicarbonates by passage through a weakly basic anion exchange resin present in free base form. The effluent from the weakly basic anion exchange resin is then passed through a lime softening bed where the bivalent calcium and magnesium ions are precipitated with the aid of lime ($CaO$ and $Ca(OH)_2$) as $CaCO_3$ or $Mg(OH)_2$, respectively. The effluent from the lime softening bed is then passed to a weakly acid cation exchanger in the free acid form which removes the remaining monovalent cations (predominantly $Na^+$). Because of the intermediate precipitation with lime in the lime softening bed, the actual ion exchange is not stoichmetrically coupled.

For regeneration, a solution of carbon dioxide in water, that is, carbonic acid, such as obtained by employing $CO_2$ by-products of refinery operations, is first conducted over the cation exchanger to displace sodium ions. The resulting effluent from this step, which contains sodium bicarbonate and free carbonic acid, is degassed, i.e. the carbon dioxide is removed, and the solution obtained in this way is used to regenerate the weakly basic anion exchanger to the free base form.

The Larsen process is limited exclusively to the regeneration of Na charged cation exchangers. The regeneration of Ca charged cation exchangers is expressly excluded from the process according to the Larsen patent because suitable chemical conditions cannot be obtained due to $CaCO_3$ precipitations the pH of $Ca(HCO_3)_2$ solutions is lower than the pH of $NaHCO_3$ solutions) for the regeneration of the cation exchanger.

(e) The SIROTHERM process. This process uses exchangers which contain weakly acid as well as weakly basic groups. In the desalination phase, both functional components are present in the free acid or base form, respectively. See, Dorfner, supra, page 188.

The desalination in the Sirotherm process is therefore also stoichiometrically coupled with respect to the removal of the neutral salt ions. The desalination is used preferably for removal of NaCl from brackfish water.

Regeneration in the Sirotherm process is effected with hot raw water, the higher degree of dissociation of $H_2O$ molecules being used to make available the $H^+$ and $OH^-$ ions.

The last three processes, the Desal process, the Larsen process and the Sirotherm process, are intended for the elimination of common salt (sodium chloride), i.e. generally 1-1-valent salts. The aim in each case is a substantial desalination of the raw water down to a small residual concentration. The occurrence of bivalent ions, such as $Ca^{++}$, and $SO_4^{--}$, makes regeneration much more difficult in the Sirotherm and Larsen processes, and the desired goal can no longer be reached. In the Desal process, the regeneration is performed with different chemicals so that this difficulty is avoided.

All three processes use a weakly basic resin as the anion exchanger. This resin is able to exchange anions only from acid to neutral solutions. Alkali waters convert the functional groups of weakly basic resins to the free base form in which they are no longer able to absorb anions. Ground water is usually lightly alkali with a pH of approximately 7 to 8.5, so that these processes cannot be used there for that reason as well.

SUMMARY OF THE PRESENT INVENTION

It is an object of the present invention to provide a process for the partial desalination of waters with increased contents of neutral salts while utilizing ion exchanger material and for the subsequent regeneration of the ion exchanger material.

Another object of the present invention is to provide such a process which avoids the difficulties of the prior art processes and simultaneously ensures with certainty that during the partial desalination, the process keeps reliably below and does not reach the required or desired limit values in salt concentration for drinking water.

A further object of the present invention is to provide such a process in which it is assured that during the regeneration of the ion exchanger material used for the partial desalination, a sufficient return of capacity for weakly acid cation exchangers as well as for anion exchangers is obtained with the least possible expenditures in an economically justifiable regeneration period.

A still further object of the present invention is to provide such a process which can be used for the partial desalination of ground water having a slightly alkali pH.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a process for partially desalinating water by a combination of a weakly acid cation exchanger material present in aqueous suspension in the free acid form and a basic anion exchanger material present in aqueous suspension in hydrogen carbonate form, and subsequently regenerating the charged ion exchanger materials, comprising: (a) performing a partial desalination with a combination or mixture of a weakly acid cation exchanger and an anion exchanger to remove neutral salt cations and neutral salt anions from the water, and (b) regenerating both exchangers together exclusively with $CO_2$. Contrary to the prior art in the most cases nonequivalent quantities are removed.

It is to be understood that both the foregoing general description and the following detailed description are exemplary, but are not restrictive of the invention.

BRIEF DESCRIPTION OF THE DRAWINGS

The accompanying drawings, in which like numbers indicate like parts, illustrate examples of presently preferred embodiments of the invention and, together with the description, serve to explain the principles of the invention.

Of the drawings:

FIG. 3 additionally shows the pH during the course of the regeneration according to the present invention.

FIG. 5 shows a desalination in accordance with the present invention by employing the regenerated weakly acid cation exchanger and regenerated strongly basic anion exchanger whose regeneration is shown in FIG. 4.

DETAILED DESCRIPTION OF THE INVENTION

Figure 1:
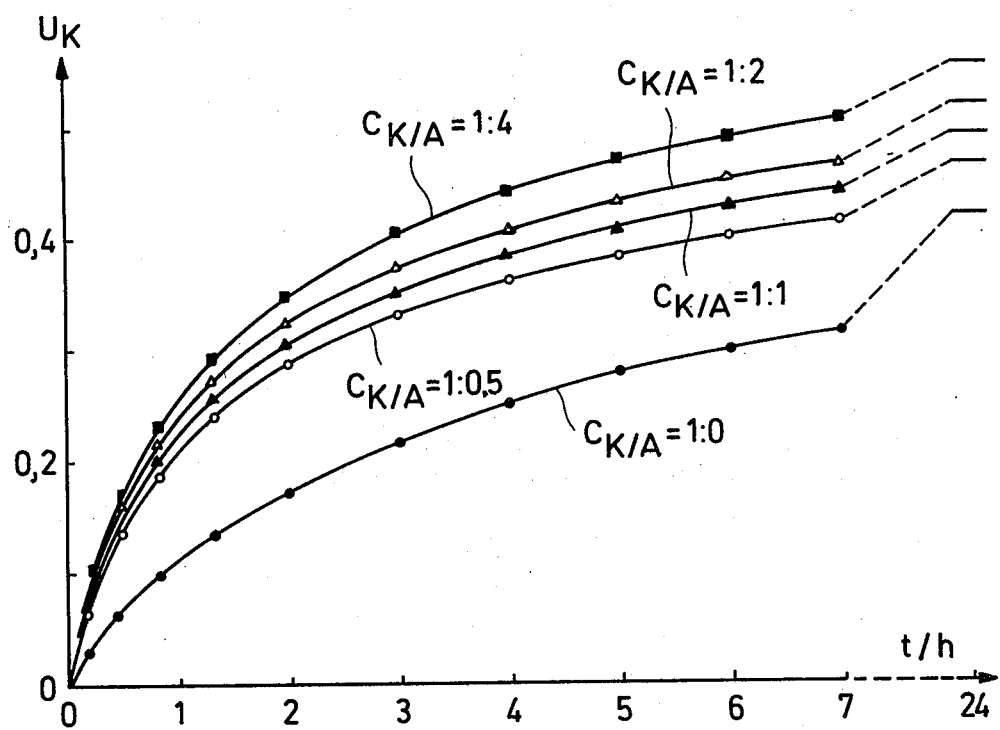
FIG. 1 shows the effect on the regeneration of a weakly acid cation exchanger in the presence of varying amounts of a strongly basic anion exchanger in accordance with the teachings of the present invention.

In the process of the present invention, the charged anion and cation exchangers are regenerated by treatment in an aqueous suspension that contains $CO_2$, i.e. carbonic acid. The $CO_2$ in the aqueous suspension can be introduced by $CO_2$ gas or $CO_2$ from other sources. The partial pressure of the carbon dioxide employed during the regeneration is above 0.1 bar, the preferred range of partial pressure being between 1 and 10 bar. The chosen partial pressure should be maintained throughout the regeneration. For the regeneration even raw water can be used.

The quantity ratio of anion exchanger to cation exchanger employed in the present invention generally is between 10:1 and 1:10 with respect to exchange equivalents, and preferably is at 1:1.

The cation exchangers and anion exchangers used in the present invention can be disposed in a mixed bed, that is, a bed which contains both the anion exchanger and the cation exchanger. Preferably regeneration is carried out in an fluidized bed. Alternatively, the exchangers can be disposed in two different columns or filter beds, with one bed containing the cation exchanger and the other bed containing the anion exchanger, and through which beds the regeneration agent flows in succession. According to the exchanger properties the raw water should first pass through the anion exchanger filter. In the regeneration phase the solution subsequently passes both filters and is then recycled.

The sequence of the process steps for the exchange processes in the present invention is as follows:

The process according to the present invention is based on the use of a weakly acid exchanger in the free acid form and of an anion exchanger in the $HCO_3^-$ form. For the elimination of, e.g., $CaSO_4$, the following exchange processes take place:

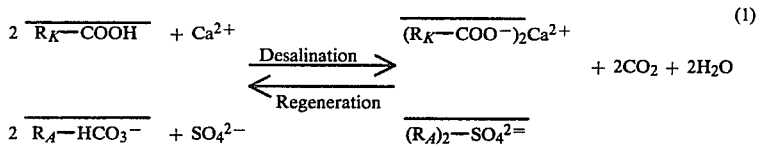

The anion and cation exchanges, however, are not stoichmetrically coupled in the process of the present invention. Due to the different dissociation properties of the resins usually an excess in usable cation exchange capacity occurs.

When there is an excess of usable cation exchange capacity, in addition to the reaction in equation (1), a "normal" decarbonization takes place according to equation (2) below:

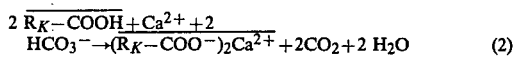

Under certain conditions (cation exchanger quantity strongly exceeding anion exchanger quantity) there may be an excess of usable anion exchange capacity, in this case in addition to the removal of $SO_4$ which occurs according to the reaction in equation (1), $SO_4{}^{--}$ ions are removed according to equation (3):

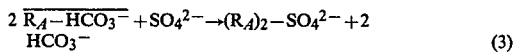

In the desalination phase, the reaction takes place from the left to the right, i.e. the exchangers convert neutral salt into carbonic acid. In the regeneration phase, carbon dioxide is introduced into the system so that the reaction takes place from the right to the left. The cation exchanger thereby discharges $Ca^{++}$ and absorb $H^+$ ions, and the anion exchanger discharges $SO_4{}^{--}$ and absorbs $HCO_3{}^-$ ions.

If an anion exchanger resin charged with chloride or sulfate ions is mixed with carbonic acid in accordance with the present invention, hydrochloric acid or sulfuric acid, respectively, is produced in low concentrations. In this way it is possible to obtain pH values in the regenerating solution of the present invention which are below the pH of a corresponding saturated $CO_2$ solution that is prepared without an anion exchanger resin for use in regenerating a weakly acid cation exchanger. For example, it is possible to obtain a regenerating solution having a pH equal to 3.92 with the use of a $CO_2$ partial pressure of 1 bar. The same solution being contacted with an anion exchange resin, pH values between 2.7 and 3.3 were obtained.

Such solutions are suitable for the regeneration of weakly acid cation exchangers which are in $Ca^{++}$ or $Mg^{++}$ form. The regeneration of the weakly acid exchangers (e.g. for the decarbonization) can thus be improved by having an anion exchange resin simultaneously present in the regeneration system.

If a weakly acid cation exchange resin charged with calcium or magnesium is mixed with carbonic acid a $Ca(HCO_3)_2$ -solution is formed (from which solid $CaCO_3$ may precipitate). Due to this exchange the $p_H$ increases and so does the $HCO_3{}^-$-concentration.

Such a solution is suitable for a partly transformation of anion exchangers to the bicarbonate form. The regeneration of the anion exchanger is thus improved by having a weakly acid cation exchanger in the regeneration system.

In the process according to the present invention, the regeneration takes place in such a way that the carbonic acid first reacts with the charged anion exchanger while forming mineral acid (equation 4 below) which then regenerates the charged cation exchanger together with the carbonic acid (equations 5 and 6 below). The sequence results from the differencies in exchange kinetics of both kinds of resins.

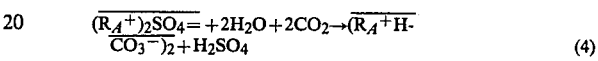

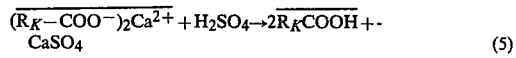

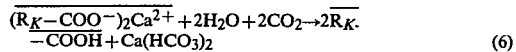

If a $CO_2$ partial pressure of 1 bar is employed when practicing the process according to DE-OS 2,714,297, the regenerating solution has a pH of about 6. Corresponding to the equilibrium described by Höll and Sontheimer (Chem. Eng. Sci. 32 (1977) pages 755-762), it is thus possible to obtain a regeneration of only 5 to 10% usable capacity. The time required to reach the regeneration equilibrium is long, due to the low $H^+$ concentration and is at 10 to 24 hours. See, Dissertation, Höll, University of Karlsruhe, 1976.

Due to the reduction in pH connected with the generation of mineral acid in the present invention, the cation exchanger is effectively regenerated. The hydrogen ion concentration in the regeneration in the present invention, which is higher than in DE-OS 2,714,297, considerably improves the position of the exchanger equilibrium and takes care that this equilibrium comes about much faster. Although the enrichment of the regenerating solution in the process of the present invention with calcium ions results in a certain increase of the pH, the pH of the regenerating solution in the process of the present invention will always be below the pH value of the regenerating solution employed in the process according to DE-OS 2,714,297.

For example, in tests performed in accordance with the present invention at a $CO_2$ partial pressure of 1 bar, a pH of 4.5 was measured as a consequence of the chosen ratio of cation exchanger to anion exchanger and also in dependence on the chosen ratio of exchanger volume to the water volume. An increase of the ratio of cation exchanger to anion exchanger increased the $p_H$. In every case, however, the pH value determined in the tests performed in accordance with the present invention was lower than in comparable experiments without the addition of anion exchanger.

Under these conditions, it is possible to regenerate a weakly acid resin up to 30 to 50 percent in the process of the present invention. The time required is 1 to 3 hours.

At the beginning of the regeneration in the present invention, the anion exchanger resin is in contact with a regenerating solution having a low pH so that the regeneration effect is initially small. In the course of the joint regeneration, however, the calcium concentration in the regenerating solution increases so that the pH rises. The $HCO_3^-$ concentration thus increases automatically, and accordingly the regeneration effect of the anion exchanger(equation 4) improves with progressing regeneration of the cation exchanger.

In the practice of the present invention, crystallization seeds which are used to precipitate $CaCO_3$ or $CaSO_4$ are not added during the regeneration, and accordingly it can be expected that a relatively high supersaturation of calcium will occur in the regeneration solution. Since according to the laws of the lime-carbonic acid equilibrium, the pH must then also be above that for $CaCO_3$ precipitation, the proportion of $HCO_3^-$ ions in the regenerating solution containing dissolved $CO_2$ is correspondingly larger so that the regeneration of the anion exchanger is influenced advantageously.

Weakly acid cation exchangers and strongly basic anion exchangers separately can be regenerated only poorly with $CO_2$, but in a joint regeneration in accordance with the present invention each type of exchanger provides optimum regeneration conditions for the other.

Figure 2:
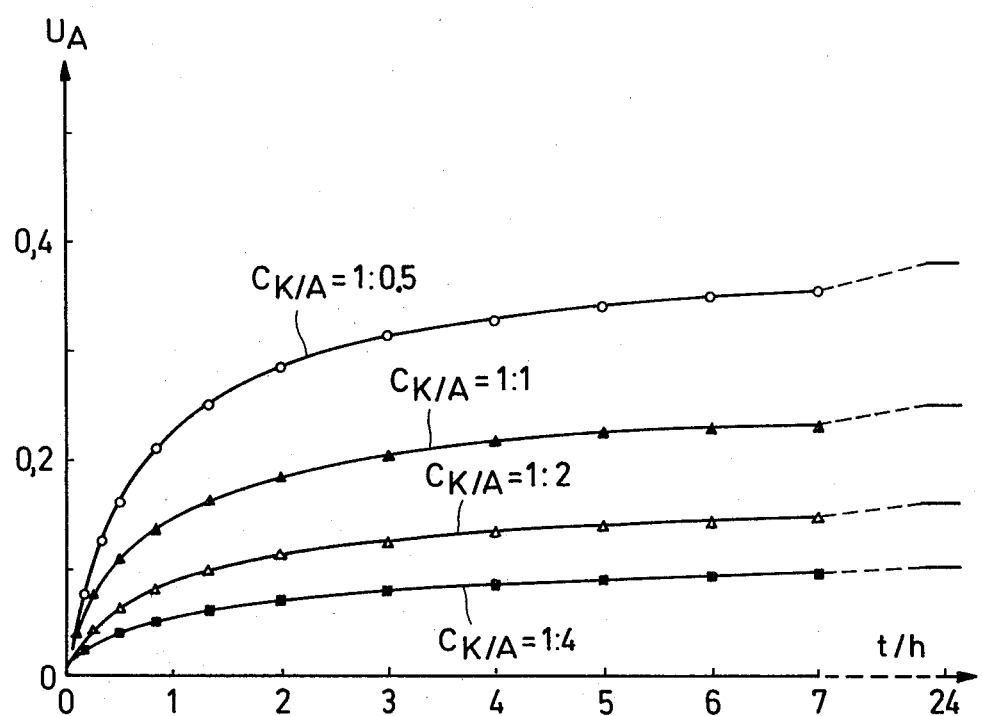
FIG. 2 shows the effect on the regeneration of a strongly basic anion exchanger in the presence of varying amounts of a weakly acid cation exchanger in accordance with the teachings of the present invention.

Experiments were conducted which followed the course of the regeneration process in accordance with the present invention with an exchanger mixture. The curves in FIGS. 1 and 2 were recorded during these examinations of the regeneration effect in the practice of the present invention. The curves in FIG. 1 show the regeneration of the cation exchanger, with the $U_K$ value being the usable capacity of the regenerated cation exchanger as a decimal fraction of its total capacity. The curves in FIG. 2 show the regeneration of the anion exchanger, with the $U_A$ value being the usable capacity of the regenerated anion exchanger as a decimal fraction of its total capacity. The $C_{K/A}$ notation on each curve shows the respective ratio of the quantity of cation exchanger to anion exchanger used in exchange equivalents.

The curves in FIG. 1 show that the regeneration of the cation exchanger is better the more anion exchanger is added. Conversely, the curves in FIG. 2 show that the anion exchanger is more efficiently converted to the $HCO_3^-$ form the more cation exchanger is available.

This brings the following consequences:

The elimination of cations and/or anions is the more efficient the lower is the residual charge of the respective exchanger. Therefore the selection of certain resin quantity ratios makes it possible to either have the cation elimination or the anion elimination predominate. The stoichiometric removal is thus an exceptional case.

If the described regenerated exchanger mixture is again mixed with water which contains, for example, $CaSO_4$, the cation exchanger removes calcium and the anion exchanger remove $SO_4$ in exchange for carbonic acid which decomposes to $CO_2$ gas and water. The process of the present invention thus makes it possible overall to realize an effective partial desalination merely with the use of carbonic acid as the regeneration agent.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

Two comparable regenerations were performed with the same charged, weakly acid cation exchanger resin, once according to the process of DE-OS 2,714,297 as set forth in part (a) below, and once according to the process of the present invention as set forth in part (b) below.

Figure 3:
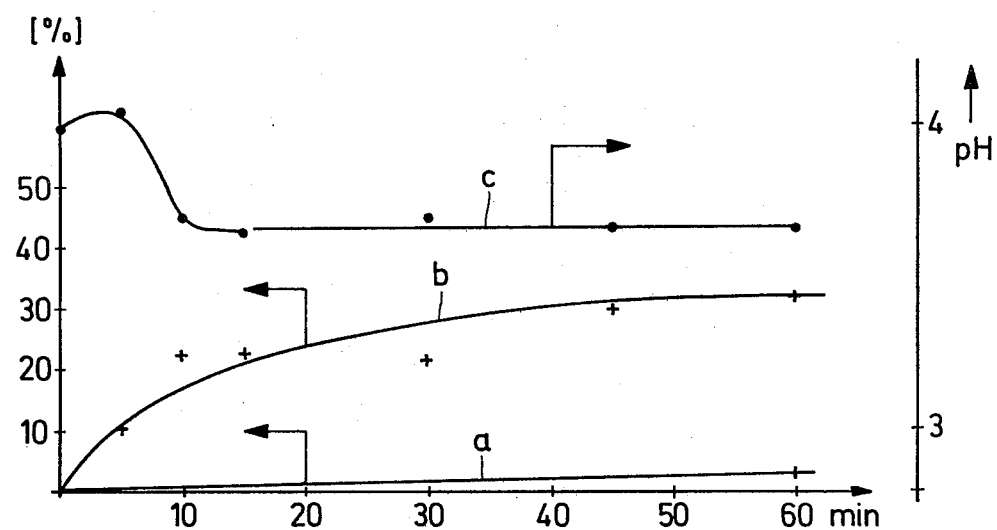
FIG. 3 shows the usable capacity of a weakly acid cation exchanger achieved by a regeneration according to a prior art technique and by a regeneration according to the present invention.

(a) 2 g of a charged weakly acid cation exchanger were regenerated for 1 hour by 2.5 liters water through which $CO_2$ has been conducted at a partial pressure of 1 bar ($CO_2$ saturation throughout the experiment) and which had an addition of 5 g $CaCO_3$. The result is plotted in FIG. 3 in curve "a" which shows usable capacity of the exchanger vs. time of regeneration. The usable capacity of the weakly acid cation exchanger in percent of total capacity is identified in FIG. 3 with the notation [%]. As can be seen in FIG. 3, curve "a" is very flat, and accordingly the $Ca^{++}$ charge decreased only slowly.

(b) 2 g of a charged weakly acid cation exchanger and 6 g of an anion exchanger charged with chloride and sulfate ions were regenerated for one hour by 5 liters water, through which $CO_2$ was conducted at a partial pressure of 1 bar and which was thus saturated with $CO_2$. The values for the efficiency of the process according to the present invention are plotted in FIG. 3 in curve "b" which shows usable capacity in % vs. time. The usable capacity of the weakly acid cation exchanger in percent of total capacity [%] was more than 30% after 60 minutes in the regeneration conducted in accordance with the process of the present invention.

As can be seen by comparing curve "b" with curve "a", FIG. 3 clearly shows the superiority of the process according to the present invention over the prior art.

Further improvements in the usable capacity after regeneration of a weakly acid cation exchanger can be obtained by optimizing the process according to the invention for each respective case.

In the process according to DE-OS 2,714,297 reported in part (a) above, the pH remained constant at about 6 during the regeneration, while the pH in the process according to the present invention reported in part (b) above was between 3.4 and 4. The measured pH values during regeneration according to the present invention were plotted in curve "c" in FIG. 3 which shows pH vs. time.

EXAMPLE 2

This example illustrates the use of the process according to the present invention in the desalination of drinking water employing a mixed bed filter system.

Test Conditions:

Cation exchanger: 1 liter
Anion exchanger: 3 liter
Ratio of exchanger equivalents: about 1:1
Raw water being desalted: total hardness (Ca+Mg): 4.87 mmol/l
sulfate concentration: 0.93 mmol/l

REGENERATION CONDITIONS $CO_2$ partial pressure: 2 bar
quantity of water: 15.2 liter (in three stages)

Figure 4:
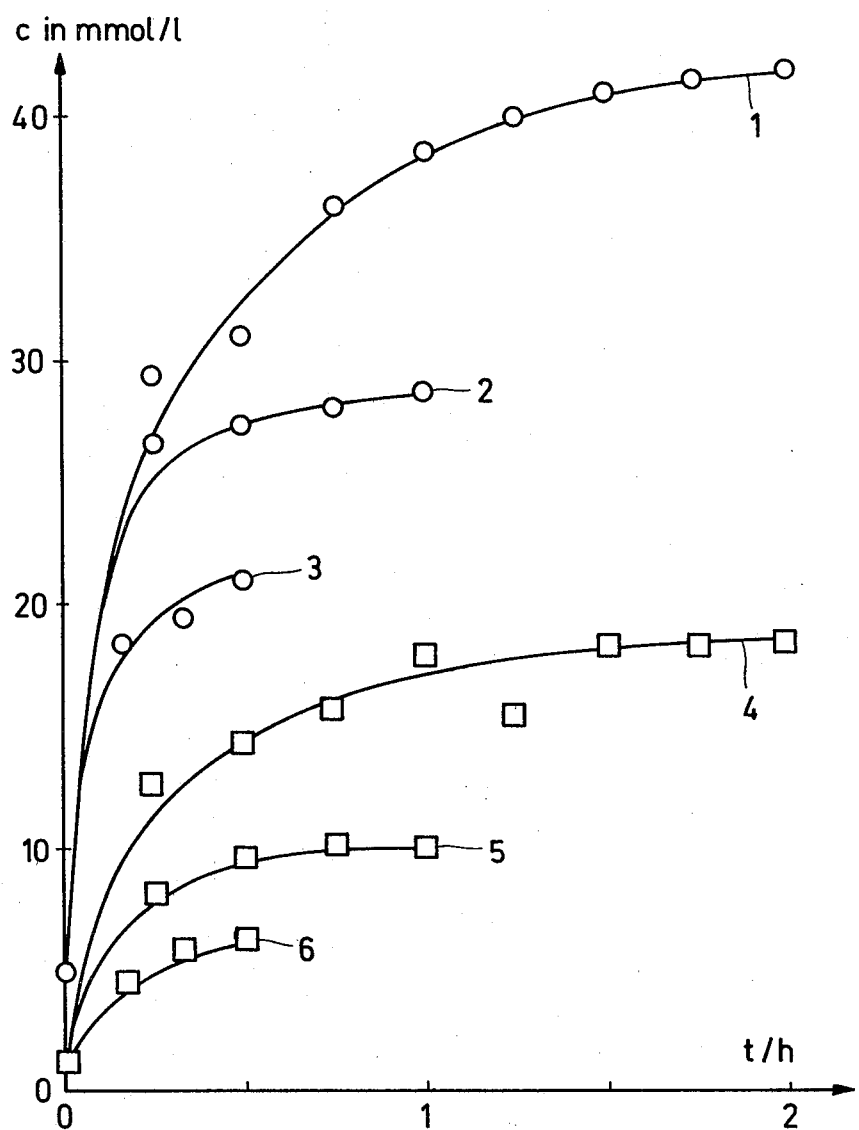
FIG. 4 shows the course of regeneration of a weakly acid cation exchanger and a strongly basic anion exchanger employed in accordance with the teachings of the present invention.

The course of regeneration is shown in FIG. 4. Curves 1, 2 and 3 show the increase in concentration of magnesium and calcium (total hardness) vs. time in the effluents from the first, second and third regeneration stages, respectively. Curves 4, 5 and 6 show the increase in concentration of sulfate vs. time in the effluents from the first, second and third regeneration stages, respectively. The first regeneration stage lasted two hours, the second regeneration stage lasted one hour, and the third regeneration stage lasted one half hour (30 minutes). It can be seen that total hardness and also sulfate reach high concentrations which are far beyond the respective saturation values. Consequently, $CaSO_4$ and $CaCO_3$ can advantageously be precipitated to redue the salt content in the discharged regeneration water.

FIG. 5 shows the total hardness and sulfate concentration during the subsequent use of this regenerated filter system for the desalination of raw water. Specifically, curve 7 shows the discharge concentration of magnesium and calcium (total hardness) vs. the amount of raw water that was treated during the desalination treatment. Curve 9 shows the concentration of magnesium and calcium (total hardness) in the raw water being treated. By viewing the spacing between curves 7 and 9, it can be seen that the total hardness of the raw water was initially reduced by 30 to 40%.

Curve 8 shows the discharge concentration of sulfate vs. the amount of raw water that was treated during the desalination treatment. Curve 10 shows the concentration of sulfate in the raw water being treated. By viewing the spacing between curves 8 and 10, it can be seen that the sulfate concentration of the raw water was reduced to less than half. A complete breakthrough of the total hardness occurred after more than 800 bed volumes of raw water (with respect to the volume of cation exchanges) were treated in the cation exchanger. The term "complete breakthrough" indicates that the exchanger was exhausted, which, in the case of the cation exchanger means that the effluent from the cation exchanger contained the same hardness concentration as the raw water which entered the cation exchanger. A complete sulfate breakthrough was reached after 230 bed volumes of raw water (with respect to the volume of anion exchangers) passed through the anion exchanger.

The test results additionally indicate that the regeneration of the two exchanger resins does not take place stoichiometrically coupled. Thus, by viewing FIG. 4, it can be seen that the cation exchanger gives off more equivalents in total hardness than the anion exchanger gives off sulfate. The same applies for the desalination phase. Thus, as can be seen from FIG. 5, the cation exchanger removes more equivalents of total hardness than the anion exchanger removes sulfate ions, so that here again the stoichiometric coupling that is indicated according to equation (1) is not achieved. Thus, by suitable selection of the mixing ratio of cation exchanger to anion exchanger, it is possible to realize selectively more decarbonization or more anion removal.

It will be understood that the above description of the present invention is susceptible to various modifications, changes and adaptations, and the same are intended to be comprehended within the meaning and range of equivalents of the appended claims.

What is claimed is:

1. Method for partially desalinating water by a combination of a weakly acid cation exchanger material present in aqueous suspension in the free acid form and a basic anion exchanger material present in aqueous suspension in hydrogen carbonate form, and subsequently regenerating the charged ion exchanger materials, comprising:
    (a) effecting the partial desalination with a weakly acid cation exchanger and an anion exchanger which are in two beds with the anion exchanger being in the first bed and the cation exchanger being in the second bed, to remove neutral salt cations and neutral salt anions from the water, and
    (b) regenerating both exchangers together exclusively by adding $CO_2$, which forms carbonic acid as a regenerating agent, to hydrogen carbonate form for the anion exchanger and free acid for the weakly acid cation exchanger, by flowing the regenerating agent in succession through the first and second beds and then recycling the regenerating agent to the first bed.

2. Process as defined in claim 1, wherein the partial pressure of carbon dioxide is more than 0.1 bar.

3. Process according to claim 1, wherein the quantity ratio of anion exchanger to cation exchanger is between 10:1 and 1:10, with respect to exchanger equivalents.

4. Process as defined in claim 3, wherein there is an excess of usable cation exchanger capacity.

5. Process as defined in claim 3, wherein there is an excess of usable anion exchange capacity.

6. Process as defined in claim 1, wherein the anion exchanger is a strongly basic anion exchanger.

7. Process as defined in claim 1, wherein the cation exchanger being regenerated is in $Ca^{++}$ or $Mg^{++}$ form.

8. Method for partially desalinating water by a combination of a weakly acid cation exchanger material present in aqueous suspension in the free acid form and a basic anion exchanger material present in aqueous suspension in hydrogen carbonate form, and subsequently regenerating the charged ion exhanger materials, comprising:
    (a) effecting the partial desalination with a weakly acid cation exchanger and an anion exchanger which are in a mixed bed, to remove neutral salt cations and neutral salt anions from the water, and
    (b) regenerating both exchangers together exclusively by adding $CO_2$, to hydrogen carbonate form for the anion exchanger and free acid for the weakly acid cation exchanger.

9. Process as defined in claim 8, wherein the regeneration is effected in a fluidized bed.

10. Process as defined in claim 8, wherein the anion exchanger is a strongly basic anion exchanger.

11. Process as defined in claim 10, wherein the regeneration is effected in a fluidized bed.

12. Process as defined in claim 8, wherein the partial pressure of carbon dioxide is more than 0.1 bar.

13. Process as defined in claim 8, wherein the quantity ratio of anion exchanger to cation exchanger is between 10:1 and 1:10, with respect to exchanger equivalents.

14. Process as defined in claim 13, wherein these is an excess of usable cation exchanger capacity.

15. Process as defined in claim 13, wherein there is an excess of usable anion exchange capacity.

16. Process as defined in claim 8, wherein the cation exchanger being regenerated is in $Ca^{++}$ or $Mg^{++}$ form.

* * * * *

UNITED STATES PATENT AND TRADEMARK OFFICE
CERTIFICATE OF CORRECTION

PATENT NO.  : 4,448,693
DATED       : May 15, 1984
INVENTOR(S) : Kiehling et al

It is certified that error appears in the above-identified patent and that said Letters Patent is hereby corrected as shown below:

On the title page, [75] Inventors: should be deleted to read:

[75] Inventors: Wolfgang Höll, Ettlingen; Brigitte Kiehling, Karlsruhe, both of Fed. Rep. of Germany --.

Claim 16, line 2, the word "form" should not be italicized or raised.

Signed and Sealed this

Sixteenth Day of October 1984

[SEAL]

Attest:

GERALD J. MOSSINGHOFF

*Attesting Officer*  *Commissioner of Patents and Trademarks*